(12) United States Patent
Ellermann et al.

(10) Patent No.: US 6,464,282 B2
(45) Date of Patent: Oct. 15, 2002

(54) CONVERTIBLE VEHICLE

(75) Inventors: Peter Ellermann, Hunteburg (DE); Markus Exner, Belm (DE); Detlef Steven, Hagen a. T.W. (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/863,496

(22) Filed: May 23, 2001

(65) Prior Publication Data

US 2001/0048231 A1 Dec. 6, 2001

(30) Foreign Application Priority Data

May 25, 2000 (DE) ..................................... 200 09 572 U

(51) Int. Cl.[7] .............................................. B62D 25/14
(52) U.S. Cl. ..................... 296/70; 296/136; 296/107.08
(58) Field of Search ............................ 296/107.08, 136, 296/76; 49/193

(56) References Cited

U.S. PATENT DOCUMENTS

| | | | |
|---|---|---|---|
| 1,933,623 A | * | 11/1933 | Gordon |
| 5,823,606 A | * | 10/1998 | Schenk et al. |
| 6,092,335 A | * | 7/2000 | Queveau et al. |
| 6,352,298 B1 | * | 3/2002 | Hayashi et al. |

* cited by examiner

Primary Examiner—D. Glenn Dayoan
Assistant Examiner—Scott A. Carpenter
(74) Attorney, Agent, or Firm—Jordan and Hamburg LLP

(57) ABSTRACT

A convertible vehicle is equipped with a tailgate (2), which is provided in the rear region of the vehicle and is supported at the vehicle body so that it can be swiveled, on the one hand, by a movement (arrow A) about a first front swiveling axis (4) into a first open position, which opens up the trunk (6) to the rear and, on the other, by a movement (arrow B) about a second rear swiveling axis (7; 7') into a second open position, opening up in the upward direction the compartment (8) for a folding top (3). Pursuant to the invention, the rear support of the tailgate (2) is formed by at least one closing device (12, 12') with a supporting body (11), which is hinged over a hinge unit (10) at the tailgate (2) and can be introduced with its free end region into an accommodating body (14), which is attached to the body of the vehicle, and can be fixed in this connection position by a locking element (15).

8 Claims, 6 Drawing Sheets

CONVERTIBLE VEHICLE

BACKGROUND OF THE INVENTION

Figure 1:
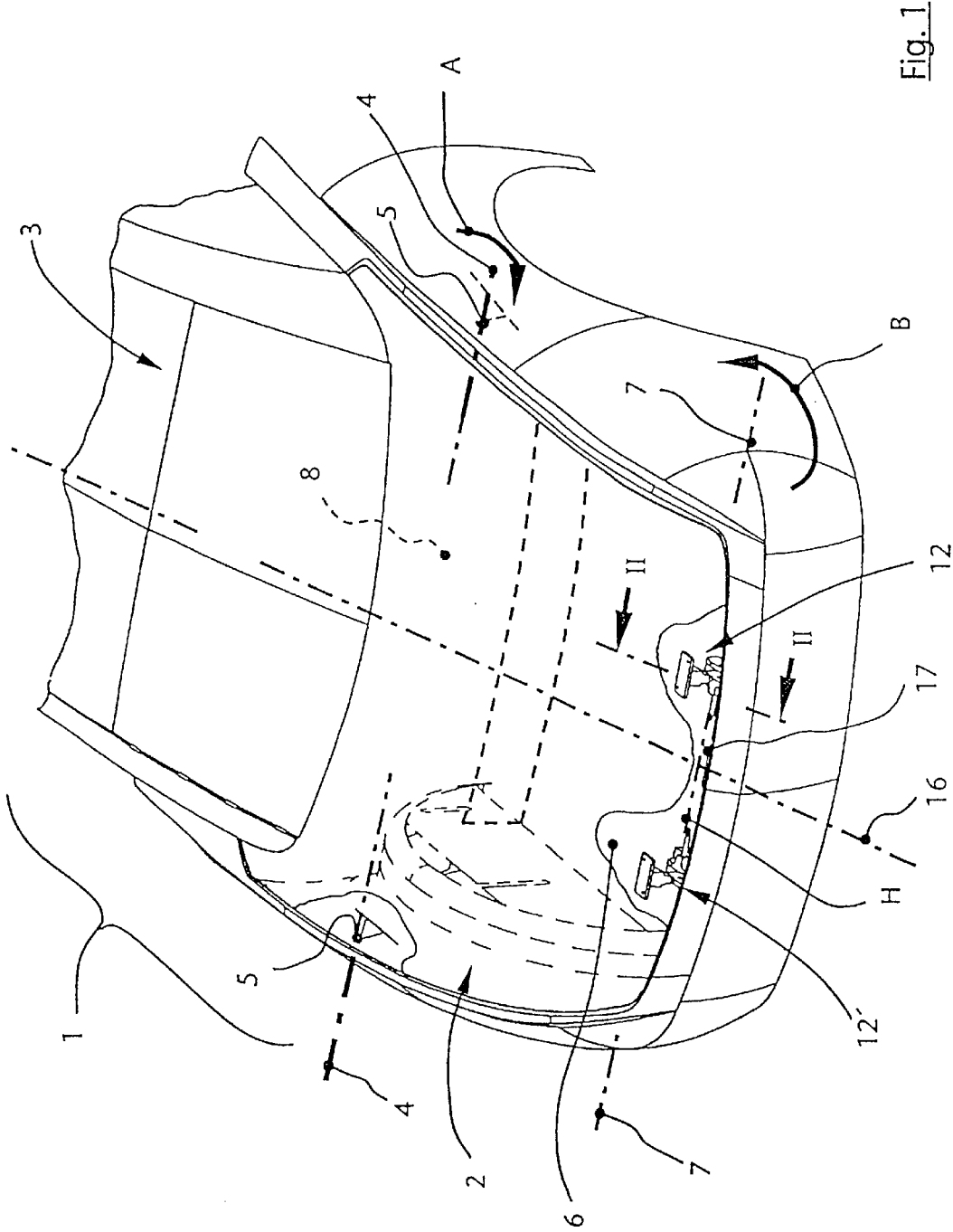

The invention relates to a convertible vehicle with a tailgate which is provided in the rear region of the vehicle.

In the case of a known convertible vehicle of this type (DE 44 45 944 C1), a tailgate is provided in the rear region of the vehicle. During movement about a first, front swiveling axis into a first open position, opening up the trunk towards the rear and, on the other hand, during movement about a second rear swiveling axis into a second open position, opening up especially the folding top compartment upward, the tailgate is supported pivotably at the vehicle body. The tailgate has a supporting frame, which requires cumbersome driving kinematics and with which furthermore the useful space in the rear region of the vehicle is limited disadvantageously.

SUMMARY OF THE INVENTION

It is an object of the invention to create a convertible vehicle of the type named above, the tailgate of which is provided with supporting components, which are disposed in a space-saving manner and are adequately stable, so that, with a simple manipulation, the tailgate can be shifted into the open positions of the folding top compartment or of the trunk and an improved accessibility is achieved.

The convertible vehicle, constructed pursuant to the invention, is provided in the region of the tailgate with a rear support, which interacts directly with the tailgate. This support is constructed in the form of two closing devices, which in each case have a connecting assembly, which is provided at the rear edge region of the tailgate, and a counter assembly, which is fixed tow the vehicle body. With this assembly, a support in the rear closed position of the tailgate as well as the controlled swiveling motion of the latter for opening up the folding top compartment is achieved in the connecting position of the assemblies.

The closing device is provided with a supporting body, which can be introduced positively and into an opposite accommodating body fixed to the vehicle body in such a manner that, during a subsequent initiation of a movement, the weight forces and acceleration forces of the tailgate opening at the front in the region of the folding top compartment, can be absorbed therewith. With that, additional supporting and stiffening parts at the underside of the tailgate can be dispensed with and limitations to the capacity of the trunk are avoided.

The closed position has a supporting body, which is constructed as a supporting prism and is fixed to the accommodating body, fixed to the-car-body, by a locking element, which can be actuated automatically. By means of appropriate stop surfaces, the frictional connection with the locking element is stabilized by an additional positive locking of the two connecting contours, the supporting and moving forces can be initiated optimally into the body of the vehicle and, with that, overloading of assemblies is avoided in the closed as well as in the swiveling position of the tailgate.

Further details and advantageous developments arise from the following drawing in which the object of the invention is illustrated in greater detail.

IN THE DRAWINGS

Figure 2:
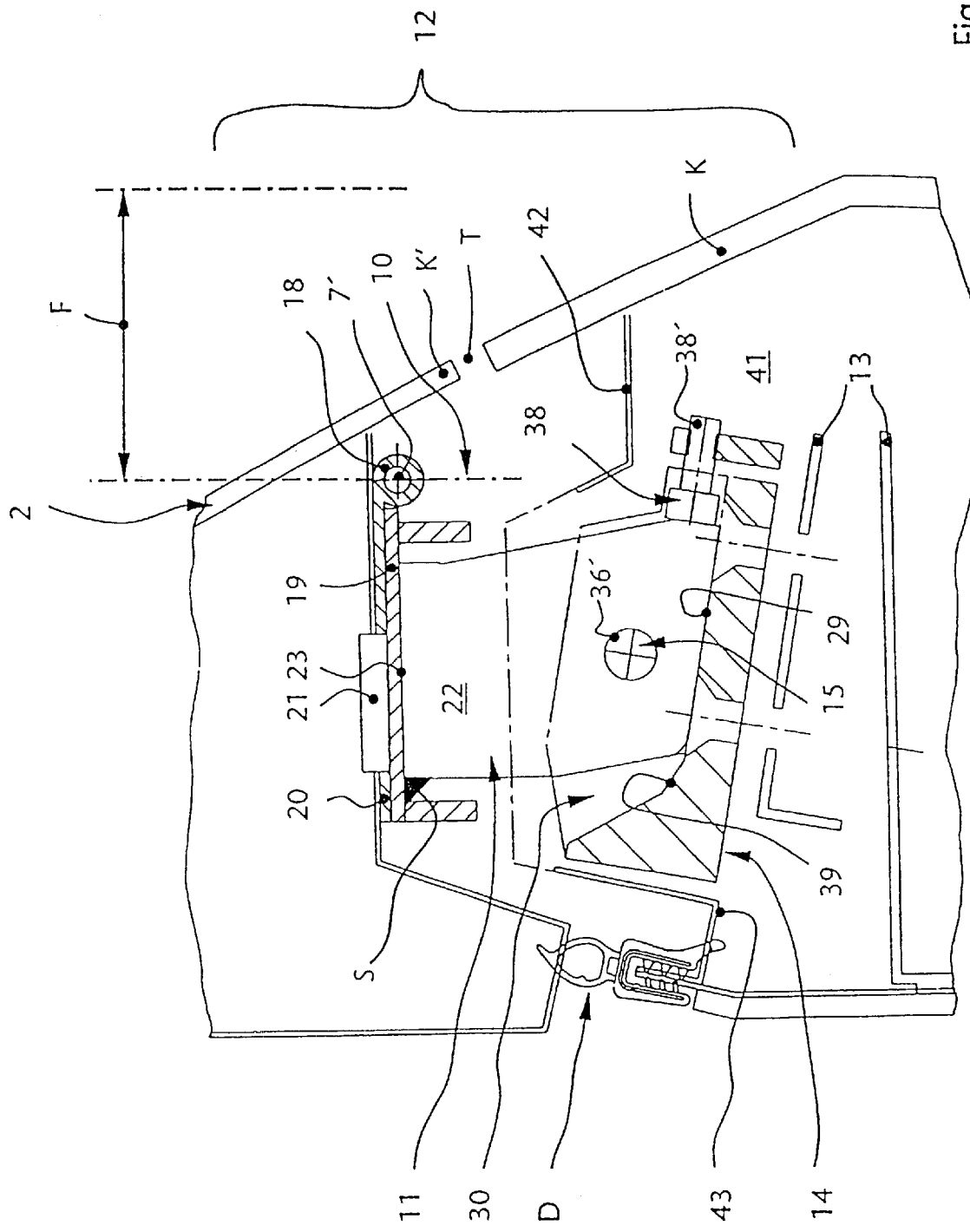
Figure 3:
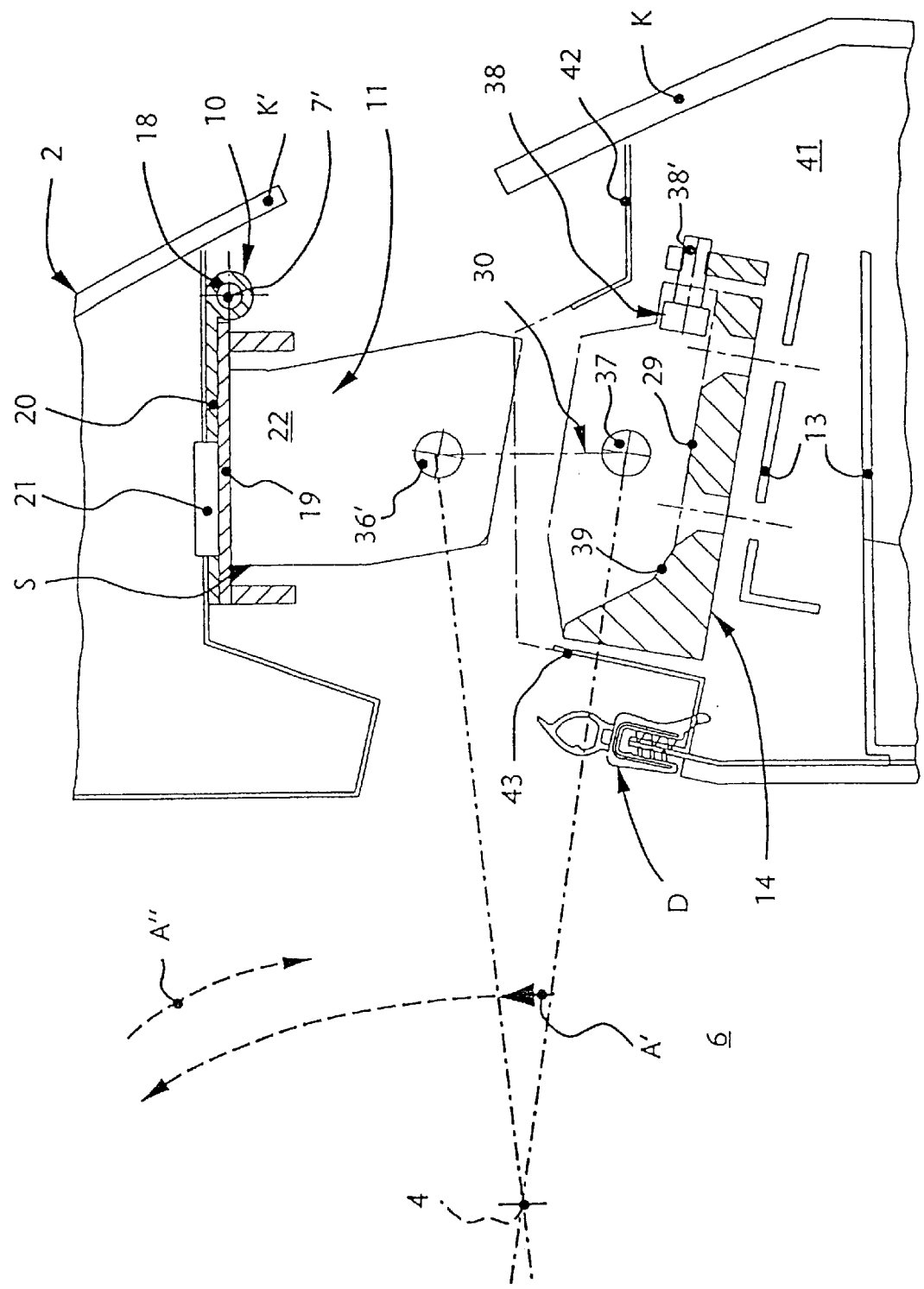
Figure 4:
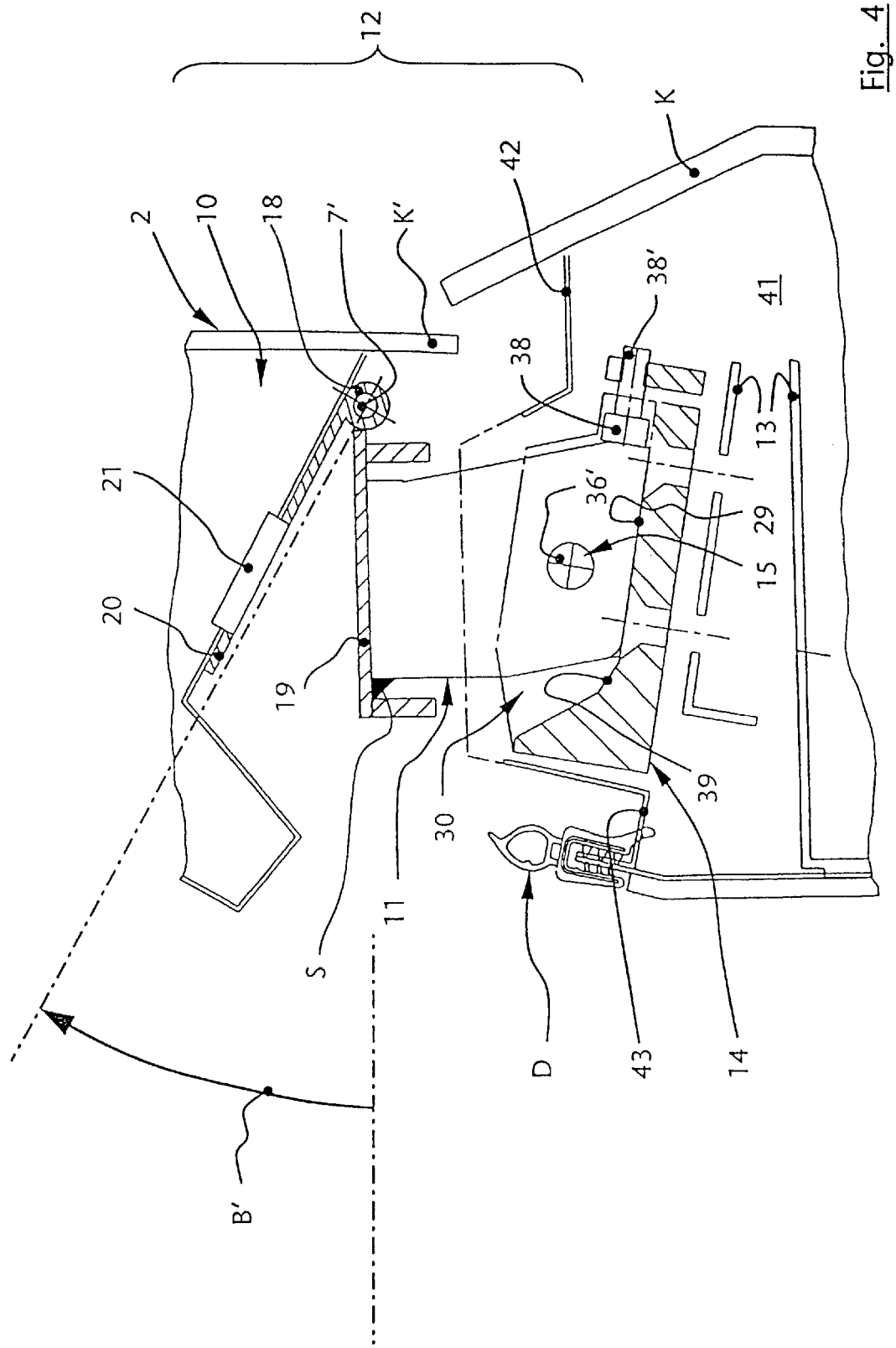
Figure 5:
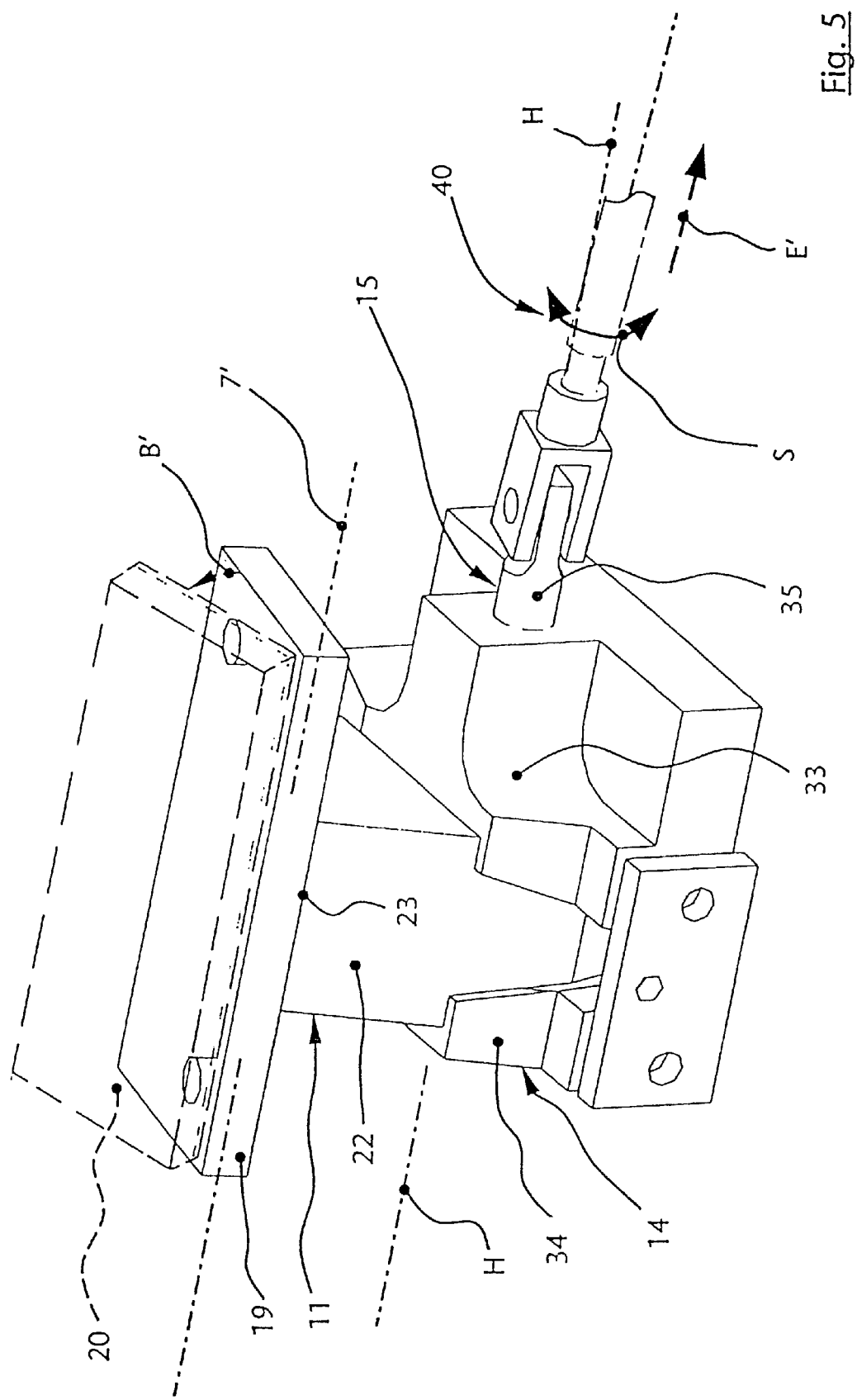
Figure 6:
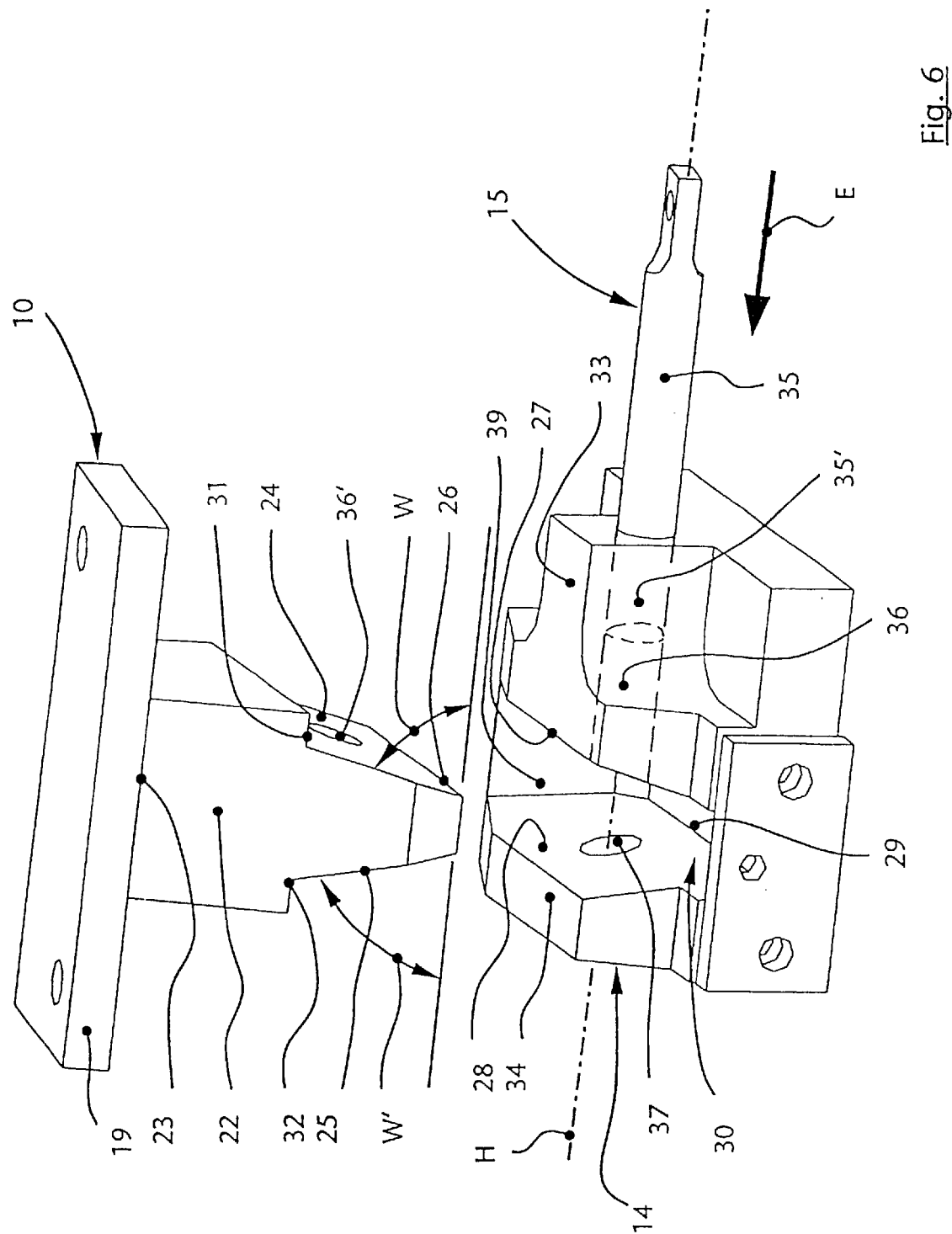

FIG. 1 shows a partially sectional rear view of a convertible vehicle with the tailgate in the closed position, FIG. 2 shows a sectional representation along a line II—II in FIG. 1, with a closing device holding the tailgate, FIG. 3 shows a sectional representation, similar to that of FIG. 2, with the closing device in and open position, FIG. 4 shows a sectional representation, similar to that of FIG. 2, with the tailgate, hinged to the closing device, in a swiveling position, FIG. 5 shows a perspective detailed representation of the closing device with the locking element in the engagement position of FIG. 2 and FIG. 6 shows a perspective representation, similar to that of FIG. 5, with the closing device in the open position of FIG. 2.

DESCRIPTION OF THE PREFERRED EMBODIMENT

FIG. 1 is a diagrammatic sectional representation of the rear view of a convertible vehicle, which is labeled 1 as a whole. A tailgate 2, which is provided in the rear region of the vehicle, as well as a folding top to 3 (in the closed position), which is disposed in front of the tailgate 2, can be seen clearly. The tailgate 2 has a front swiveling axis 4 with components 5 of a front support, the details of which are not show. When the tailgate is moved about this swiveling axis 4 (arrow A), it is shifted to into an open position, in which the trunk 6 is opened up from the rear. This opening motion can be brought about manually or by means of driving components, the details of which are not show. In the rear region, the tailgate 2 is supported by components forming a rear swiveling axis 7 in such a manner, that the tailgate 2 can be swiveled into a second open position, opening up especially a front folding top compartment 8 for stowing the folding top 3 (arrow B).

Pursuant to the invention, the convertible vehicle 1 is provided with a tailgate 2, the rear support, in the region of the swiveling axis 7, is formed by at least one closing device 12 (FIG. 2), which has a supporting body 11, which is hinged over a hinge unit 10 to the tailgate 2. With its free end region, the supporting body 11 can be introduced into an accommodating body 14, which is supported especially in the region of a holding sheet of metal 13 and is fixed in this connecting position (FIG. 2) by a central locking element 15, so that a support, pivotably stable in each movement phase, is formed for the tailgate 2.

The perspective representation of FIG. 1 illustrates that the tailgate 2 has two closing devices 12 and 12', which are disposed symmetrically to the longitudinal median plane 16 of the vehicle. The following description refers to the closing device 12, it being understood that the components described are correspondingly also present in mirror image fashion in the case of the second closing device 12'.

The closing device 12, as a whole, forms a structural unit, which interacts with the support 5, which is provided in the region of the front swiveling axis 4 and integrated in the automatic driving concept of the convertible vehicle 1 in such a manner, that the above-described opening motions (arrow A, arrow B) can be carried out by way of appropriate control components, which are not shown. In the region of the locking element 15, the closing device 12 has an actuator or the like 17 (FIG. 1), which controls the movement of the locking element 15 into the closed or open position (FIG. 5, FIG. 6) and is disposed particularly in the rear region of the vehicle in the region of the longitudinal median plane 16 in such a manner, that the two closing devices 12 and 12' can be operated jointly.

After the locking element 15 (arrow E') has been shifted into the release position (FIG. 3, FIG. 6), the tailgate 2 and the supporting body 11 can be swiveled up jointly with the hinge unit 10 into the position (arrow A', FIG. 3) opening up the trunk 6. Subsequently, this assembly can be returned jointly with the tailgate 2 into the connecting position (FIG. 2) (arrow A"; FIG. 3). In this connecting position, the locking element 15 is shifted into the closed position (arrow E) and, after release of the front supports at 5, the tailgate 2 can now be swiveled in the region of the rear hinge unit 10 into the open position (arrow B', FIG. 4), so that the folding top compartment 8 is opened up below the folding top 3 for accommodating the latter. The position of the tailgate 2, in which the folding top compartment is open or closed, is determined by the swiveling motion (arrow B') about a rear swiveling axis 7', which is formed by the hinge unit 10 and, in an optimum arrangement with the hinge unit 10, can be shifted into the vicinity of the rear of the vehicle (distance F; FIG. 2).

The hinge unit 10, consists of two hinge plates 19 and 20, forming the swiveling axis 7' in the region of a joint part 18, the hinge plate 19 being connected, for example, by a welded connection at S with the supporting body 11. In the superimposed position of the two hinge plates 19 and 20, shown in FIG. 3, an additional holding element 21 is acting, with which an unintended component motion or opening motion in the arrow direction B' (FIG. 4) is avoided. As holding element 21, particularly a permanent magnet or an electromagnet is conceivable, with which the hinge unit 10 is held in the contacting position shown in FIG. 2 during a movement control, opening the trunk 6. Likewise, it is conceivable that, instead of the magnetic holding element 21, a clip connector or a similar locking part, the details of which are not shown, is provided and, when the tailgate 2 is moved appropriately, is automatically locked with the closing device 12 (FIG. 3) and, when the tailgate 2 (FIG. 4) is swiveled about the axis 7 or 7', unlocked automatically.

The connecting positions of the closing device 12 of FIGS. 2 and 5 make it clear that the supporting body 11 can be placed positively against the accommodating body 14 and, in this connecting position, the locking element 15 forms a frictional connection. With that, a particularly stable supportive connection of the components is achieved. The supporting body 11 advantageously is constructed as a supporting prism 22 (pontoon shape), which advantageously extends essentially in wedge-shaped fashion and the base 23 of which lies against the hinge unit 10 or the hinge plate 19. The respective surfaces and top surfaces 24, 25 and 26 can be placed at least regionally against respective supporting surfaces 27, 28 and 29 of a supporting recess 30, which is provided in the accommodating body 14 (FIG. 5, FIG. 6).

With their angles of slope W and W', the two surfaces 24 and 25, which extend in the longitudinal direction of the vehicle and are disposed in mirror image fashion at the supporting prism 22, define a wedge shape, with which the supporting prism 22 can be placed against the correspondingly extending supporting surfaces 27 and 28 in the accommodating body 14. In addition, the supporting prism 22, in the region of the two surfaces 24 and 25, has supporting shoulders 31 and 32 at the foot side. In the connected position, these supporting shoulders 31 and 32 can be supported at the upper side of the accommodating body 14 (FIG. 5).

The accommodating body 14 is provided with respective holding jaws 33 and 34, which form the boundary of the supporting recess 30 with the supporting surfaces 27 and 28 and at which the locking element 15, which is provided as a thrust bolt 15. The thrust bolt 35 is held displaceably in the holding jaw 33 in a through-hole 36, so that, when the through-hole 36 is disposed aligned with the holding jaw 33, the thrust bolt 35 can be shifted into the connecting position (arrow E, FIG. 6) and, at the same time, an end region 35' of the thrust bolt 35 can be introduced into an accommodating opening 37 of the holding jaw 34 (movement axis: H).

For the positional accurate support of the supporting prism 22 in the supporting recess 30, a stop 38 is provided at the bottom of this recess 30. This stop 38 enables an adjustment to be made with a setscrew 38 or the like, so that, in particular, the dimensions of the gap T of the tailgate 2 to the rear region of the vehicle body K and the position of the seal D can be adapted optimally (FIG. 2). Opposite as to the stop 38 in the supporting recess 30, a guiding surface 39 is provided, by means of which the movement of the supporting prism 22 is guided in the connecting position shown.

During a closing movement of the tailgate 2 (closing the trunk), the supporting prism 22 is guided first over the guiding surface 39 into the supporting recess 30. At the end of this movement phase, centering over the two supporting surface pairings 24 and 27 or 25 and 28 takes place, so that an exact position of the tailgate 2 in the transverse direction of the vehicle (Y direction) is achieved. The optimum position in the longitudinal direction of the vehicle (X direction) is adjusted with the stop 38. In addition, by placing the supporting prism 22 on the supporting surface 29 of the supporting recess 30, the end position can be determined in the vertical direction (Z direction).

By looking at FIG. 5 and FIG. 6, the movement of the thrust bolt 35, at which a locking rod assembly 40, extending to the driving mechanism 17 (FIG. 1) in the embodiment shown, is hinged, becomes clear. This locking rod assembly 40 may be provided, for example, with a bilaterally acting hydraulic cylinder (not shown) as an actuator or the like 17 (FIG. 1). Likewise, it is conceivable to dispose an electric motor with a stepping-up transmission, a rotary disc, etc. (not shown) at the locking rod assembly 40, so that the rod assembly 40 and the thrust bolt 35 can be shifted by a swiveling and pushing movement (arrows E, E', S; FIG. 5) in the direction of the common axis H and introduced into the locking position or returned from this.

The locking device 12, described above, is small and can be fixed to the tailgate 2 or to parts of the vehicle body K, K', so that only little space is required for the installation. In particular, the assembly, in the region of the accommodating body 41, can be encased by appropriate couplings 42, 43, so that a visually pleasing configuration is achieved.

What we claim is:

1. A convertible vehicle, comprising:
    a folding top;
    a body including a trunk and a compartment for storing said folding top;
    a tailgate rotatable about a forward axis defined on the vehicle to open said trunk and rotatable about a rearward axis defined on the vehicle to open said compartment; and
    at least one closing device for supporting a rear of said tailgate at a rear of the vehicle and defining said rearward axis,
    each of said at least one closing device comprising:
        a hinge unit coupled to said tailgate;
        a supporting body connected to said hinge unit such that said tailgate is pivotable with respect to said supporting body;
        an accommodating body connected to said vehicle body and arranged to receive said supporting body when said tailgate is in a closed position; and locking means for locking said supporting body in connection with said accommodating body, wherein said hinge unit comprises a first metallized hinge plate connected to said tailgate, a second metallized hinge plate pivotally connected to said first hinge plate to thereby define said rearward axis as a pivot axis of said second hinge plate relative to said first hinge plate and a magnetic body for selectively holding said first and second hinge plates together.

2. A convertible vehicle, comprising:

a folding top;

a body including a trunk and a compartment for storing said folding top;

a tailgate rotatable about a forward axis defined on the vehicle to open said trunk and rotatable about a rearward axis defined on the vehicle to open said compartment; and at least one closing device for supporting a rear of said tailgate at a rear of the vehicle and defining said rearward axis, each of said at least one closing device comprising:
  a hinge unit coupled to said tailgate;
  a supporting body connected to said hinge unit such that said tailgate is pivotable with respect to said supporting body;
  an accommodating body connected to said vehicle body and arranged to receive said supporting body when said tailgate is in a closed position; and
  locking means for locking said supporting body in connection with said accommodating body, wherein said accommodating body defines a recess and said supporting body is a prism oriented toward said accommodating body and having a base in contact with said hinge unit and outer surfaces adapted to be placed at least partially against respective supporting surfaces of said recess defined by said accommodating body, and two of said outer surfaces of said prism extend in a longitudinal direction of the vehicle and are arranged in mirror image fashion, said two outer surfaces defining a wedge shape adapted to be placed in contact with correspondingly supporting surfaces of said accommodating body.

3. A convertible vehicle, comprising:

a folding top;

a body including a trunk and a compartment for storing said folding top;

a tailgate rotatable about a forward axis defined on the vehicle to open said trunk and rotatable about a rearward axis defined on the vehicle to open said compartment; and at least one closing device for supporting a rear of said tailgate at a rear of the vehicle and defining said rearward axis, each of said at least one closing device comprising:
  a hinge unit coupled to said tailgate;
  a supporting body connected to said hinge unit such that said tailgate is pivotable with respect to said supporting body;
  an accommodating body connected to said vehicle body and arranged to receive said supporting body when said tailgate is in a closed position; and
  locking means for locking said supporting body in connection with said accommodating body, wherein said accommodating body includes holding jaws forming a supporting recess therebetween in which said supporting body is received, said locking means comprising a thrust bolt extending through said holding jaws and said supporting body when said supporting body is received in said recess of said accommodating body.

4. The convertible vehicle of claim 3, wherein one of said holding jaws includes a through-hole and said supporting body includes a through-hole, said thrust bolt being retained in said one of said holding jaws and being displaceable through said through-hole in said one of sad holding jaws into said through-hole in said supporting body when said supporting body is received in said recess of said accommodating body.

5. A convertible vehicle, comprising:

a folding top;

a body including a trunk and a compartment for storing said folding top;

a tailgate rotatable about a forward axis defined on the vehicle to open said trunk and rotatable about a rearward axis defined on the vehicle to open said compartment; and at least one closing device for supporting a rear of said tailgate at a rear of the vehicle, each of said at least one closing device comprising:
  a first member pivotally attached to said tailgate such that said rearward axis is defined by a pivot axis of said first member;
  a second member connected to said vehicle body and arranged to receive said first member when said tailgate is in a closed position; and
  locking means for locking said first member in connection with said second member, wherein said first member comprises a supporting body, each of said at least one closing device further comprising a hinge unit having a first hinge plate connected to said tailgate and a second hinge plate connected to said supporting body, and said first and second hinge plates are metallized, said hinge unit further comprising a magnetic body for selectively holding said first and second hinge plates together.

6. A convertible vehicle, comprising:

a folding top;

a body including a trunk and a compartment for storing said folding top;

a tailgate rotatable about a forward axis defined on the vehicle to open said trunk and rotatable about a rearward axis defined on the vehicle to open said compartment; and at least one closing device for supporting a rear of said tailgate at a rear of the vehicle, each of said at least one closing device comprising:
  a first member pivotally attached to said tailgate such that said rearward axis is defined by a pivot axis of said first member;
  a second member connected to said vehicle body and arranged to receive said first member when said tailgate is in a closed position; and
  locking means for locking said first member in connection with said second member, wherein said second member defines a recess and said first member comprises a prism oriented toward said second member and having outer surfaces adapted to be placed at least partially against respective supporting surfaces of said recess defined by said second member, and two of said outer surfaces of said prism extend in a longitudinal direction of the vehicle and are arranged in mirror image fashion, said two outer surfaces defining a wedge shape adapted to be placed in contact with correspondingly supporting surfaces of said second member.

7. A convertible vehicle, comprising:

a folding top;

a body including a trunk and a compartment for storing said folding top;

a tailgate rotatable about a forward axis defined on the vehicle to open said trunk and rotatable about a rearward axis defined on the vehicle to open said compartment; and at least one closing device for supporting a rear of said tailgate at a rear of the vehicle, each of said at least one closing device comprising:
  a first member pivotally attached to said tailgate such that said rearward axis is defined by a pivot axis of said first member;
  a second member connected to said vehicle body and arranged to receive said first member when said tailgate is in a closed position; and
  locking means for locking said first member in connection with said second member, wherein said second member includes holding jaws forming a supporting recess therebetween in which said first member is received, said locking means comprising a thrust bolt extending through said holding jaws and said first member when said first member is received in said recess of said second member.

8. The convertible vehicle of claim 7, wherein one of said holding jaws includes a through-hole and said first member includes a through-hole, said thrust bolt being retained in said one of said holding jaws and being displaceable through said through-hole in said one of said holding jaws into said through-hole in said first member when said first member is received in said recess of said second member.

* * * * *